Figure 1:
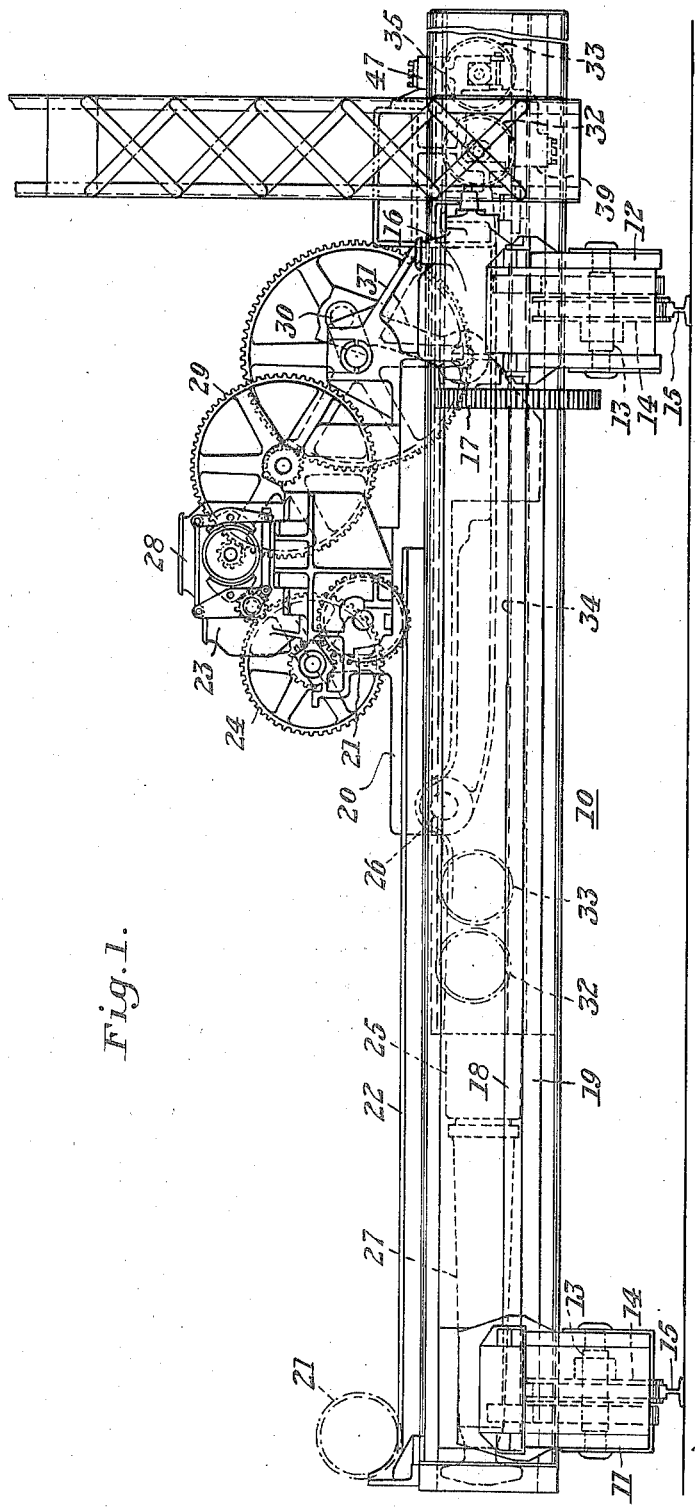

Sept. 24, 1940. G. W. YANNEY 2,215,896
BALANCING WHEEL FOR CHARGING MACHINE CARRIAGES OR THE LIKE
Filed June 17, 1939 2 Sheets-Sheet 1

INVENTOR
George W. Yanney
by his attorneys
Stebbins, Blenko
& Parmelee

Sept. 24, 1940.   G. W. YANNEY   2,215,896
BALANCING WHEEL FOR CHARGING MACHINE CARRIAGES OR THE LIKE
Filed June 17, 1939   2 Sheets-Sheet 2

INVENTOR
George W. Yanney
by his attorneys
Stebbins, Blenko
& Parmelee

Patented Sept. 24, 1940

2,215,896

UNITED STATES PATENT OFFICE 2,215,896

BALANCING WHEEL FOR CHARGING MACHINE CARRIAGES OR THE LIKE

George W. Yanney, Alliance, Ohio, assignor to The Alliance Machine Company, Alliance, Ohio, a corporation of Ohio Application June 17, 1939, Serial No. 279,736

2 Claims. (Cl. 105—163)

This invention relates to balancing wheels such as are usually employed on traveling carriages or the like subject to tilting, as by overhanging loads, for example.

The use of balancing wheels on traveling carriages subject to tipping is now quite common. A particular example is afforded by charging machines for open hearth furnaces. These machines have a traveling carriage on which is mounted a tilting bracket having a peel extending therefrom for engaging the boxes in which the components of a furnace charge are placed preparatory to dumping in the furnace. The balancing wheels operate between upper and lower rails. There must necessarily be working clearance between the wheels and their rails, and this clearance permits a slight tilting of the carriage on picking up a box or dumping the contents thereof. This slight tilting causes severe shocks to be applied to the whole machine and, in particular, to the operator thereof who is stationed on the carriage. Such shocks are hard on the apparatus itself but even more important is their effect on the physical condition of the operator and, in some cases, the operators' health has suffered therefrom to an extent such that they were compelled to discontinue charging machine operation.

I have invented novel balancing wheels for a charging machine carriage or the like which eliminate the objectionable effects heretofore experienced as a result of the slight tilting of the carriage permitted by the necessary working clearance between the balancing wheels and their rails. In a preferred form of the invention, I provide separate balancing wheels for engaging the upper and lower rails, respectively, and journal each wheel in bearings having means resiliently urging them toward the rail with which the wheel is adapted to engage. I also provide means for adjusting the pressure with which the wheels engage their rails. As a result, each balancing wheel is always in firm engagement with its rail, without any clearance therebetween. Any tendency to tilt the carriage is thus yieldingly opposed and all tilting movement of the carriage is cushioned before any shock can be transmitted thereby to the machine as a whole. This preserves the machine from much abuse and also avoids the possibility of injuring the operator's health.

Figure 2:
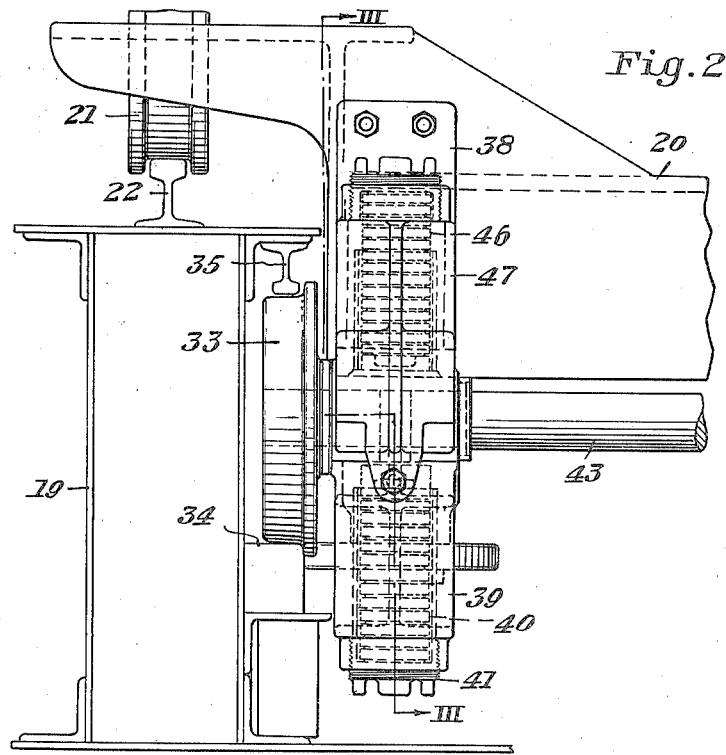
Figure 3:
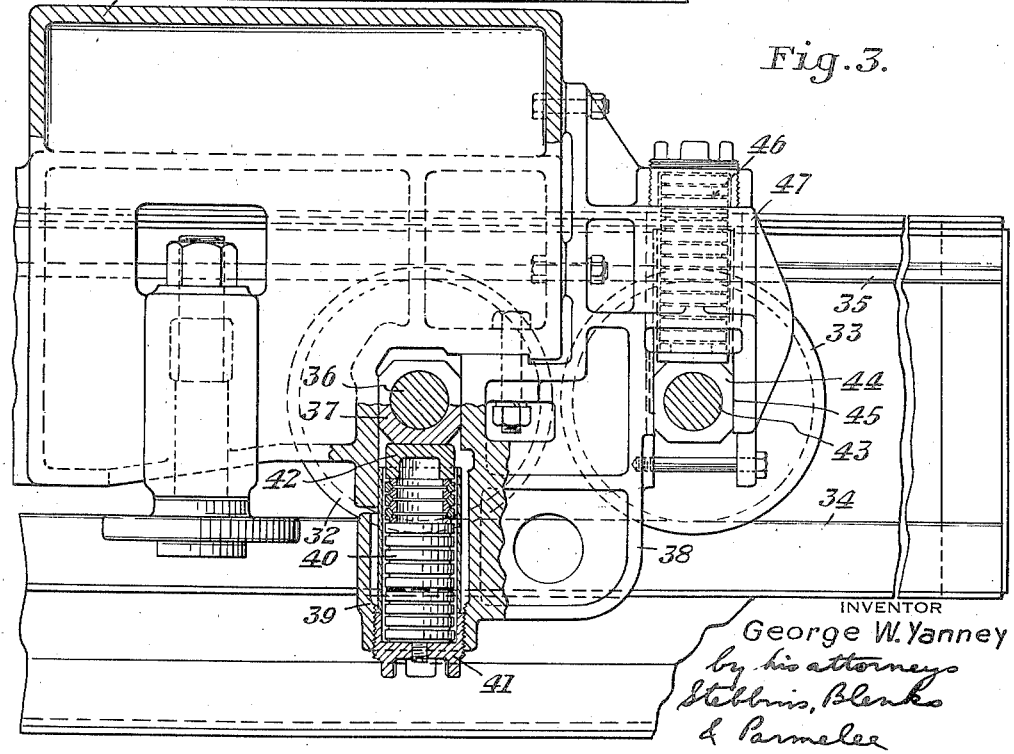

A preferred embodiment of the invention is illustrated in the accompanying drawings and will be described in detail hereinafter. In the drawings, Fig. 1 is a side elevation of a charging machine having the invention incorporated therein;

Fig. 2 is a partial end elevation of the charging machine, showing one side only thereof; and Fig. 3 is a view partly in section along the line III—III of Fig. 2 and partly in elevation.

Referring now in detail to the drawings, a charging machine indicated generally at 10 comprises end frames 11 and 12. The end frames are provided with shafts 13 journaled in opposite ends thereof having wheels 14 thereon adapted to travel on rails 15. The wheels 14 are driven by motors 16 through reduction gearing 17 and cross shafts 18.

The end frames have brackets for receiving a pair of spaced parallel bridge girders 19 extending at right angles thereto. A carriage 20 is supported on the bridge girders 19 by main driving wheels 21 traveling along rails 22 on top of the girders. The wheels 21 are driven by a motor 23 through reduction gearing 24.

A bracket 25 is pivoted to the carriage 20 at 26 and is provided with a peel 27. A motor 28 operates the bracket 25 through reduction gearing 29, a crank shaft 30 and a pitman 31.

The construction described so far is conventional and forms no part of the present invention. The charging machine operates in the known manner to lift a charging box from a car in front of a furnace, advance it to the interior of the furnace and there dump the contents thereof. The reciprocating movement of the carriage necessary to complete this cycle is indicated by the chain-line position of the main driving wheels 21 at the ends of the rails 22 above the end frame 11.

The carriage 20 and the apparatus mounted thereon is substantially balanced on the axis of the wheels 21. In order to prevent tipping of the carriage when the peel is actuated to raise a charging box or dump the contents thereof, thereby suddenly applying or removing forces tending to tilt the carriage, I provide balancing wheels 32 and 33 preferably mounted adjacent the rear end of the carriage and, in the construction shown, duplicated at opposite sides thereof. The wheels 33 engage rails 34 extending along the inner sides of the bridge girders 19. The wheels 32 engage overhead rails 35 secured to the inner overhanging flanges of the girders 19. The wheels 32 are secured to a cross shaft 36 journaled in bearings 37. The bearings 37 are slidable in ways formed partly in the carriage 20 at the rear end thereof and partly in bearing castings 38 bolted thereto. The castings 38 include housings 39 for compression ring springs 40. The springs 40 have bearing on cups 41 threaded into the housings 39 and on blocks 42 engaging the bearings 37. By adjusting the cups 41 in the housings 39, the pressure exerted by the springs 40 on the bearings 37 may be varied to suit different operating conditions. In any case, it will be clear that the wheels 32 are yieldingly urged into engagement with the overhead rails 35.

The wheels 33 are secured to a cross shaft 43. The shaft is journaled in bearings 44 slidable in ways 45 formed in the castings 38. Spring assemblies indicated generally at 46 are mounted in housings 47 formed on the castings 38, similar in structure and function to the springs 40 and accessories therefor already described. The spring assemblies 46 serve yieldingly to urge the bearings 44 downwardly whereby the wheels 33 are constantly maintained in engagement with the rails 34.

By reason of the balancing wheels 32 and 33 and their mountings as above described, the rear end of the carriage 20 is cushioned against up or down movement and is normally held in a centralized position. The application of a force tending to raise the rear end of the carriage, such as is encountered when the peel is operated to raise a charging box, is resisted by the springs 40 and while these springs give slightly under load, they provide a constant cushioning effect and limit the tilting movement of the carriage to a very small amount. The springs 40, because of their construction, may be of very high capacity, with only a slight compression.

Down tilting of the rear end of the carriage such as the operation of dumping a charging box would tend to cause, is similarly opposed by the spring assemblies 46 which yieldingly urge the wheels 33 into engagement with the rails 34. It will thus be apparent that the carriage 20 is cushioned against tilting movement in either direction and that while some slight tilting movement may result on sudden application or removal of overhanging loads, no shock to the machine or operator will result since the springs associated with the balancing wheels absorb all torques suddenly applied to the carriage.

The invention has a still further advantage in that the cars on which the charging boxes are moved into position for lifting by the peel 27 are of various heights above the level of the rails 15. Thus, while it is possible to adjust the vertical movement of the outer end of the peel 27 for the average elevation of the charging box when in position to be lifted and dumped, if a given car is slightly higher than the average, because of the condition of its springs, or the like, the end of the peel will strike the bottom of the slot in the charging box a relatively heavy blow, as the peel is lowered to take a grip on the box. This blow is transmitted through the peel to the carriage 20 tending to cause angular movement of the latter about the axis of the wheels 21. The resilient mountings of the balancing wheels proper fully absorb this shock and not only save the charging machine from the effect thereof but also soften the blow applied to the car on which the charging box rests. This avoids possible damage to the springs of the car, if any, and also saves the car from shock if it has no springs as is usually the case.

It will be apparent from the foregoing description and explanation that the invention provides balancing wheels for traveling carriages subject to tipping because of overhanging loads suddenly applied or removed, which prevent any shock from being applied to the carriage by reason of the necessary working clearances between balancing wheels and their cooperating rails. The spring mountings for the balancing wheels which I employ are simple and relatively inexpensive yet highly effective in accomplishing the desired result, viz., the maintenance of the balancing wheels in constant yielding engagement with their respective rails, thereby centralizing the rear end of the carriage and cushioning it against vertical movement in either direction as the overhanging loads are applied or removed. The advantage of avoiding such shocks, from the standpoint of preserving the machine from damage and eliminating impairment of the health of the operator, needs no emphasis.

Although I have illustrated and described herein but a preferred form of the invention, it will be recognized that changes may be made in the construction disclosed without departing from the spirit of the invention or the scope of the appended claims.

I claim:

1. A traveling carriage comprising a frame, a pair of wheels on which the frame is principally supported, said wheels traversing track rails, a pair of vertically spaced balancing rails parallel to said track rails, a pair of balancing wheels mounted on said frame and spaced horizontally from said first-mentioned wheels, each of said balancing wheels being adapted to engage one of said balancing rails, and an independent spring mounting on said frame constantly urging each balancing wheel into engagement with its balancing rail, thereby opposing any tendency of overhanging loads on said carriage to tilt it on said first-mentioned wheels.

2. In a movable carriage, supporting wheels adapted to travel on a track, a lifting member projecting beyond one end of the carriage and tending when loaded to tilt said carriage on its wheels, a pair of balancing wheels mounted on said carriage and spaced horizontally from said first-mentioned wheels, a pair of vertically spaced rails engaged by said balancing wheels respectively, means effective constantly to urge the balancing wheels into engagement with said rails, thereby opposing tilting of the carriage, and mountings on said frame in which said spring means are disposed.

GEORGE W. YANNEY.